United States Patent
Reyes, Jr.

(10) Patent No.: US 8,226,095 B2
(45) Date of Patent: Jul. 24, 2012

(54) MOBILE PLATFORM ASSEMBLY

(76) Inventor: Jamie Alberro Reyes, Jr., Pembroke Pines, FL (US)

( * ) Notice: Subject to any disclaimer, the term of this patent is extended or adjusted under 35 U.S.C. 154(b) by 208 days.

(21) Appl. No.: 12/653,843

(22) Filed: Dec. 18, 2009

(65) Prior Publication Data

US 2011/0148062 A1    Jun. 23, 2011

(51) Int. Cl.
    *A63C 17/06*    (2006.01)
(52) U.S. Cl. ............... 280/87.042; 280/11.226
(58) Field of Classification Search ........... 280/87.01, 280/87.021, 87.041, 87.042, 87.043, 63, 280/78, 11.19, 11.223, 11.216, 11.221, 11.226, 280/11.24

See application file for complete search history.

(56) References Cited

U.S. PATENT DOCUMENTS

| | | | |
|---|---|---|---|
| 108,184 A | 10/1870 | Pollitt | |
| 904,088 A | 11/1908 | Rother | |
| 3,351,353 A | 11/1967 | Weitzner | |
| 3,355,185 A | 11/1967 | Carter | |
| 3,379,454 A | 4/1968 | Woodman | |
| 3,512,798 A | 5/1970 | Siegel | |
| 4,076,263 A | 2/1978 | Rand | |
| 4,106,786 A | 8/1978 | Talbott | |
| 4,149,735 A | 4/1979 | Blackburn et al. | |
| 4,150,838 A * | 4/1979 | Lappage | 280/87.042 |
| 4,191,371 A | 3/1980 | Armer, Jr. | |
| 4,225,147 A | 9/1980 | Lowery | |
| 4,445,699 A | 5/1984 | Darasko | |
| 4,572,529 A | 2/1986 | Thomas | |
| 4,618,158 A | 10/1986 | Liberkowski | |
| 5,409,265 A | 4/1995 | Douglass | |
| 5,549,331 A | 8/1996 | Yun et al. | |
| 5,590,890 A | 1/1997 | Rosso et al. | |
| 5,716,074 A | 2/1998 | Theodorou | |
| 6,065,762 A | 5/2000 | Brelvi | |
| 6,293,565 B1 | 9/2001 | Bouchard et al. | |
| 6,568,695 B2 * | 5/2003 | Dornan | 280/87.042 |
| 6,616,583 B1 | 9/2003 | Stack | |
| 6,637,827 B2 | 10/2003 | Hurwitz | |
| 6,698,776 B2 | 3/2004 | Todd | |
| 6,705,977 B1 | 3/2004 | Ziak | |
| 6,848,750 B2 | 2/2005 | Hurwitz | |
| 6,899,344 B1 | 5/2005 | Raynor | |
| 7,172,044 B2 * | 2/2007 | Bouvet | 180/181 |
| 2001/0052683 A1 * | 12/2001 | Vance | 280/87.041 |
| 2002/0070514 A1 | 6/2002 | Costa, Jr. et al. | |
| 2003/0146584 A1 | 8/2003 | Gaus | |
| 2003/0146586 A1 | 8/2003 | Hurwitz | |
| 2005/0146100 A1 | 7/2005 | Hurwitz | |
| 2005/0285363 A1 * | 12/2005 | Joung et al. | 280/87.041 |
| 2006/0287173 A1 | 12/2006 | Guadagno | |
| 2007/0235970 A1 | 10/2007 | Stillinger | |

* cited by examiner

*Primary Examiner* — John Walters
(74) *Attorney, Agent, or Firm* — Malloy & Malloy, P.L.

(57) ABSTRACT

A mobile platform such as, but not limited to, a skateboard type of structure capable of movably transporting an individual over a supporting surface. A wheel assembly connected to the platform includes at least one but more practically a plurality of wheels having a spherical configuration extending outwardly from opposite surfaces of the platform into engagement with the supporting surface so as to define at least two operative positions of the platform. A mounting assembly and each of a plurality of different embodiments of a bearing assembly are structured to facilitate a substantially universal, rotational movement of said wheel(s) relative to said platform. The different embodiments of the bearing assembly facilitate either a free or unrestricted universal rotational movement of the one wheel relative to the platform or alternatively a universal, rotational movement thereof concurrently about more defined rotational axes.

37 Claims, 10 Drawing Sheets

MOBILE PLATFORM ASSEMBLY

BACKGROUND OF THE INVENTION

1. Field of the Invention

This invention is directed to a mobile platform assembly such as, but not limited to, a skateboard, roller skate, etc. and including at least one but more practically a plurality of spherically configured wheels, each movably interconnected to the platform by a bearing assembly and a mounting assembly. Each bearing assembly is disposed and structured to facilitate movement of a corresponding spherical wheel through a substantially universal, rotational range of motion relative to the platform, either freely or about more specifically defined axes.

2. Description of the Related Art

Numerous types of mobile support platforms have been known and utilized for years. The popularity of such structures has even risen to the level where the use thereof defines an "extreme" sport. As such, skateboards or other mobile platforms are utilized by skilled riders to perform a variety of difficult maneuvers. While not limited to skateboards, mobile platforms include various types of wheel structures adaptable for use in the performance of sporting maneuvers as well as recreation, exercising, and travel for relatively short distances. Mobile platforms of the type referred to include roller skates, rollerblades as well the aforementioned skateboards. In use, these types of platforms are manually propelled and are dimensioned and configured to support one or both of the individual's feet as the platform travels over a variety of different supporting surfaces.

As set forth above, skateboards in particular have become widely developed and generally comprise an elongated platform large enough for an individual to be supported in an upright or standing orientation. The wheel assembly associated therewith typically includes a front wheel structure and a rear wheel structure, wherein the portion of the platform extending between such front and rear wheel structures are sufficient to support the riding individual in the manner described.

In addition, various types of roller skate designs have been popularized for sporting, recreational and entertainment uses. As conventionally designed and structured, roller skates normally include a plurality of two pairs of substantially disk shaped wheels each supported on either a leading and trailing axle, wherein the two axles are disposed generally adjacent a front and rear portion a skate base respectively. As such, sufficient stability is provided for the user to move and/or be transported over a variety of different surfaces while also performing a variety of different maneuvers. More recently developed shoe skates are commonly known as "blade" skates, "inline" skates and/or rollerblades, which normally comprise a plurality of disk shaped wheels disposed in a linearly aligned relation to one another as they collectively extend along the length of the sole or base portion of the shoe skate on which they are mounted.

While structures of the type set forth above have enjoyed extensive popularity over many years, they are at least generally recognized as being at least partially restrictive, at least to the extent of allowing the rider or user to perform movements incorporating a somewhat limited degree of maneuverability. To overcome such disadvantages, an additional wheel assembly or wheel structure has been incorporated in skates, skateboards and other mobile platforms wherein one or all of the wheels include a spherical configuration. Accordingly, while spherical wheels have been generally known, the attachment or movable interconnection of this type of wheel to the under portion of the support platform also presents problems and/or disadvantages.

Such disadvantages are typically related to a relatively limited range of motion of the spherical wheel(s) thereby restricting maneuverability of the mobile platform to which such one or more wheels are attached. More specifically, known and conventional interconnecting and/or mounting structures associated with spherical wheels frequently diminish the potential freedom of movement which an improved spherical wheel assembly and appropriate mounting assembly could accomplish. In addition, the use of spherical or ball-shaped wheels may also suffer from problems and disadvantages associated with stability and/or maintenance problems. Similar to the above recognized disadvantages, such reliability problems could also be the result of at least partially ineffective connecting or mounting structures used to movably interconnect the spherical or ball type wheels to the support platform.

Accordingly, there is a need in this area for a support platform assembly capable of supporting and/or transporting an individual over a variety of different surfaces. Such a preferred and proposed mobile platform assembly should overcome the problems and disadvantages recognized in known and conventional mobile platforms, of this type, by providing sufficient maneuverability while reliably and efficiently interconnecting the wheel assembly to the platform. Also, the adaptability of an appropriate wheel assembly to a variety of different types of support platforms including skateboards, roller skates, etc. should be such as to increase the performance of all such mobile support platforms. Finally, a proposed and preferred mobile support platform which incorporates a versatile and high performance wheel assembly should be designed and structured for commercial development at a reasonable cost and price so as to be available to a greater portion of the consuming public.

SUMMARY OF THE INVENTION

The present invention is directed to an assembly structured to movably support or transport an individual over a variety of different supporting surfaces. In a practical application, the mobile platform may take the form of a skateboard or similar structure which is manually propelled and which is capable of supporting one or both feet of the individual on the outer exposed surface thereof.

Accordingly, the mobile platform assembly of the present invention includes a wheel assembly rotationally connected to the platform and disposed in engaging relation to the supporting surface over which the platform travels. In addition, the wheel assembly includes at least one, but more practically in at least some embodiments, a plurality of wheels each having a spherical configuration. The one or more spherical wheels are movably connected to the platform through a cooperatively structured mounting assembly and bearing assembly associated with each of the spherical wheels. As set forth in greater detail hereinafter, the bearing assembly associated with each spherical wheel may comprise one of a plurality of different embodiments structured to movably interconnect it to the platform. Common to each of the different embodiments of the bearing assembly is the capability of facilitating a substantially universal, rotational movement of the corresponding spherical wheel relative to the platform, as the wheel engages and travels over the supporting surface. However, distinguishing structural features of the embodiments of the bearing provide for a substantially universal, rotational range of motion of the corresponding wheel in a substantially free or unrestricted manner or about more specifically defined axes.

Additional structural and operative features associated with the various preferred embodiments of the present invention include a mounting assembly associated with each of the plurality of wheels. The mounting assembly comprises at least one mounting or retaining plate preferably having an annular configuration and a central aperture cooperatively dimensioned and configured to facilitate receipt of a corresponding one of the spherical wheels there through. Further, each of the spherical wheels is cooperatively dimensioned and disposed relative to the central aperture to concurrently extend or protrude outwardly from opposite faces or surfaces of the mobile platform. This protruding disposition of the spherical wheel significantly enhances the versatility of the mobile platform by allowing the use thereof while the platform is in either one of at least two operative positions of the platform.

Each of the two operative positions are defined by a different one of the opposite surfaces of the platform being disposed in an outer or exposed orientation and in confronting, engaging and supporting relation to the individual riding the mobile platform. More specifically, due to the fact that each of the spherical wheels extend concurrently outward from each of the opposite surfaces of the platform a sufficient distance to engage the supporting surface over which the platform travels, the user of the mobile platform can choose to "ride" or be supported on different ones of the opposite surfaces, dependent on which of the two operative positions the platform is disposed. To facilitate the versatility of operating and/or using the mobile platform in this manner, the configuration of the platform may have to be modified and/or customized in order to permit the orientation of the platform in either of the at least operative positions.

Each bearing assembly associated with a different one of the spherical wheels is movably connected to and/or retained by a corresponding one of the mounting or retaining plates defining the mounting assembly. As such, the mounting or retaining plates associated with each spherical wheel may be cooperatively disposed and structured with the corresponding bearing assembly for that wheel and include a bearing a race therein. Accordingly, the bearing assembly associated with each spherical wheel is disposed in movable, retaining engagement with the exterior surface of the corresponding wheel, while being movable within or along a corresponding retaining or mounting plate disposed to interconnect the corresponding bearing assembly and the spherical wheel to the platform.

Therefore, one preferred embodiment of the bearing assembly includes a plurality of at least two bearing sections each connected to a common mounting assembly and disposed in spaced relation to one another. The spacing between the two bearing sections is sufficient to provide a sufficient force on the exterior surface of the corresponding wheel to retain it on the platform during its substantially universal rotational movement relative to the platform. More specifically, the two sections of a common bearing assembly for each spherical wheel are preferably disposed on opposite sides of an imaginary "great circle" generated on the exterior surface of the spherical wheel. For purposes of clarity, an accepted definition of the term "great circle" is a circle, in this case imaginary, generated on the surface of a sphere that divides that sphere equally into two hemispheres. Accordingly, the "great circle" may also be accurately defined as the intersection of the surface of a sphere with a plane passing through the center of that sphere.

Therefore, the distance of the bearing sections from the great circle may vary but should be sufficient to provide adequate retaining force to facilitate maintaining the wheel in movably connected and supporting relation to the platform. In one preferred embodiment of the bearing assembly each spherical wheel is allowed to "freely" rotate through a substantially universal range of motion. This is due to the fact that the spherical wheel is only interconnected to the support platform through the provision of the spaced apart sections of the corresponding bearing assembly. Further these two retaining bearing sections extend in surrounding relation to and in continuous movable engagement with the exterior surface of the spherical wheel, while the bearing sections are movably retained by the corresponding mounting plate(s).

In contrast, another preferred embodiment of the bearing assembly includes an axle extending through the center of a corresponding one of the spherical wheels and being of sufficient dimension to at least partially extend outwardly from the opposite sides of the sphere. When operatively connected in the manner set forth in greater detail hereinafter, this centrally disposed axle will define a first rotational axis of the wheel. Moreover, this preferred embodiment of the bearing assembly includes a first bearing portion and a second bearing portion. The first bearing portion rotationally interconnects the centrally deposed axle to the spherical wheel. The second portion of the bearing assembly preferably includes two bearing sections at least generally similar to the two bearing sections described above. Moreover, when operatively assembled, the two bearing sections of this additional embodiment of the bearing assembly are disposed in continuously surrounding relation to the exterior surface of the wheel and in engaging relation therewith. Also these two bearing sections are connected to one another and to opposite end portions of the centrally disposed axle.

Accordingly, the axle extending through the spherical wheel and the wheel itself is rotational with the second bearing portion, comprising the two bearing sections, relative to the mounting assembly connected to the bearing assembly. Therefore, the first bearing portion of each bearing assembly associated with each spherical wheel, rotationally interconnects the axle to the spherical wheel. The second bearing portion of each bearing assembly associated, associated with each spheerical wheel, interconnects the spherical wheel, through fixed attachment to the axle, to the platform and/or more specifically, to a corresponding mounting assembly. As a result, this preferred embodiment of the bearing assembly defines more specific rotational characteristics by affiliating each spherical wheel to rotate about a first rotational axis at least partially defined by the centrally disposed axle and concurrently about a second rotational axis which is transverse or perpendicular to the second rotational axis.

Therefore, the various preferred embodiments of the mobile platform assembly of the present invention will facilitate its use in a manner which overcomes certain disadvantages and problems of known mobile platforms by increasing the maneuverability thereof. As more fully described hereinafter, such increased maneuverability is at least partially attributable to the ability of each spherical wheel being capable of moving relative to the platform through a substantially universal, rotational range of motion independently of one another. Further, the support platform may vary in size and shape and still be capable of being disposed in either of at least two operative positions respectively defined by different ones of the opposite platform surfaces being disposed in confronting, supporting relation to an individual rider. As such, an individual may effectively orient the platform between the first and second operative position even during travel of the platform especially by individuals which are considered highly skilled in the operation or use of the platform, such as but not limited to, skateboard type assemblies.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As shown in the accompanying Figures, the present invention is directed to an assembly generally indicated as 10 which is structured to transport or otherwise movably support an individual rider over a variety of supporting surfaces. The platform 12 may be in the form of a skateboard or other mobile device which is typically, but not exclusively, manually propelled. However, it is emphasized that the platform 12 of the assembly 10 may be structured, dimensioned and configured to define a number of different types of support platform other than a skateboard, such as a base of a scooter, a roller skate, shoe skate, etc.

Accordingly, the assembly 10 includes the platform 12, including an outer, exposed surface 14 and an undersurface 16. In conventional fashion, the outer, exposed surface 14 is typically disposed in supporting, generally confronting engagement or relation to the individual rider. As such, the outer supporting surface is of a sufficient dimension and configuration to receive and support one foot or both feet of the rider thereon. In addition, the mobile assembly 10 includes a wheel assembly 18 which includes at least one but more practically a plurality of wheels 20 one or more of which comprises a spherical configuration. Each of the one or more wheels 20 are movably connected to the platform 12 by a mounting assembly generally indicated as 22 and one of a plurality of embodiments of a bearing assembly generally indicated as 24, 24', 24'', etc. as explained in greater detail hereinafter.

Figure 2:
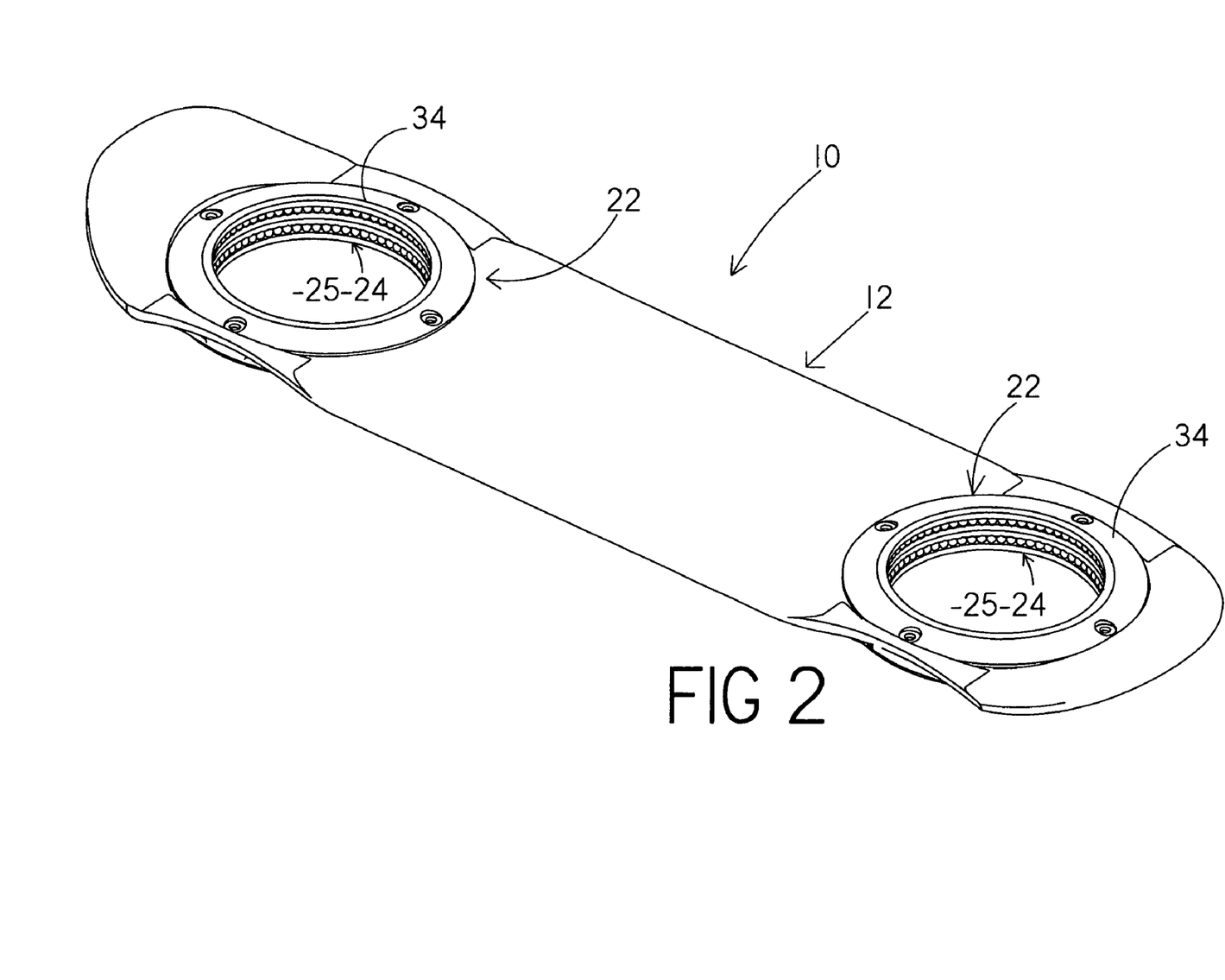
FIG. 2 is a perspective view of the embodiment of FIG. 1 absent a wheel assembly.
Figure 3:
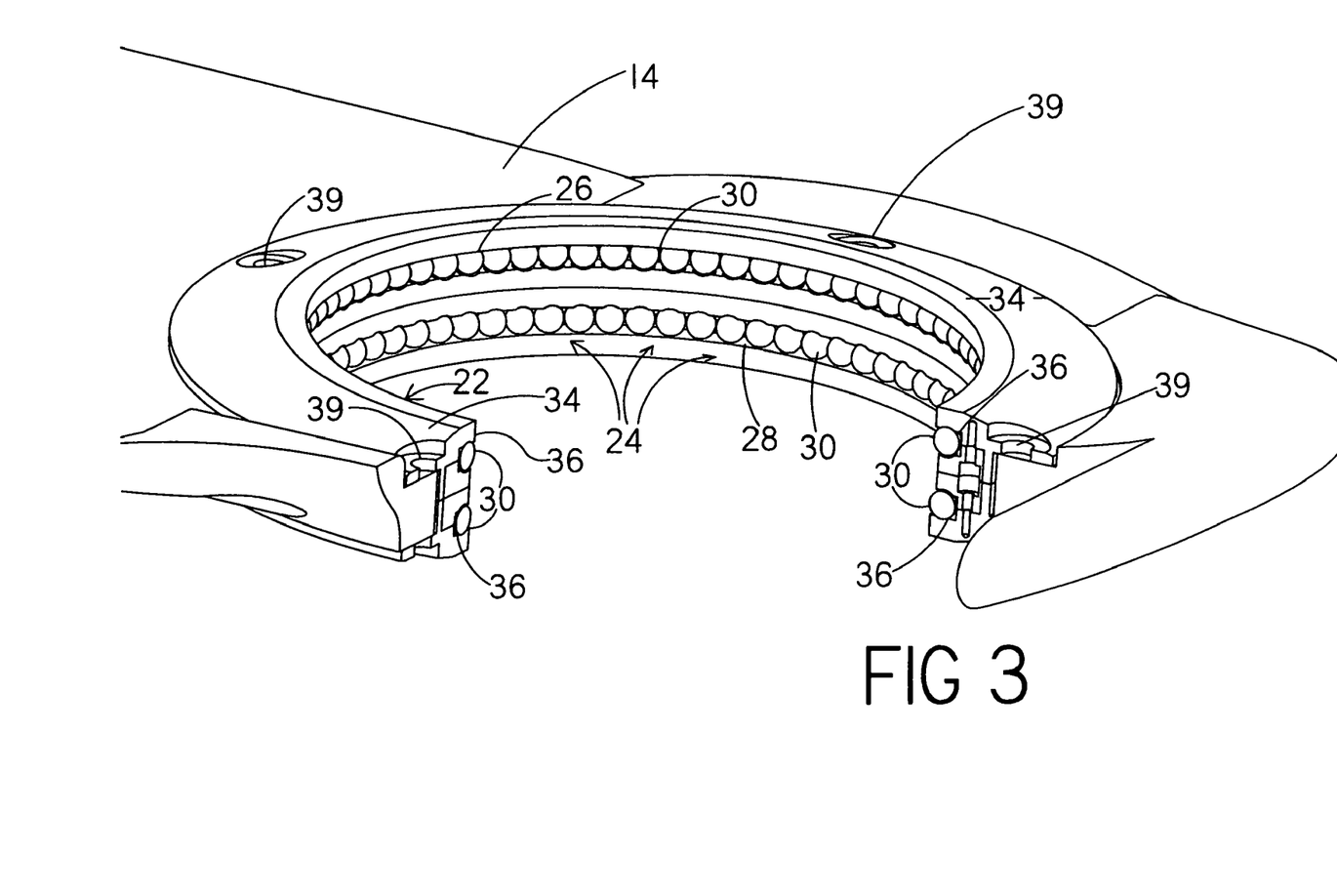
FIG. 3 is a perspective view in partial cutaway of one preferred embodiment of a bearing assembly associated with the embodiment of FIG. 2.
Figure 4:
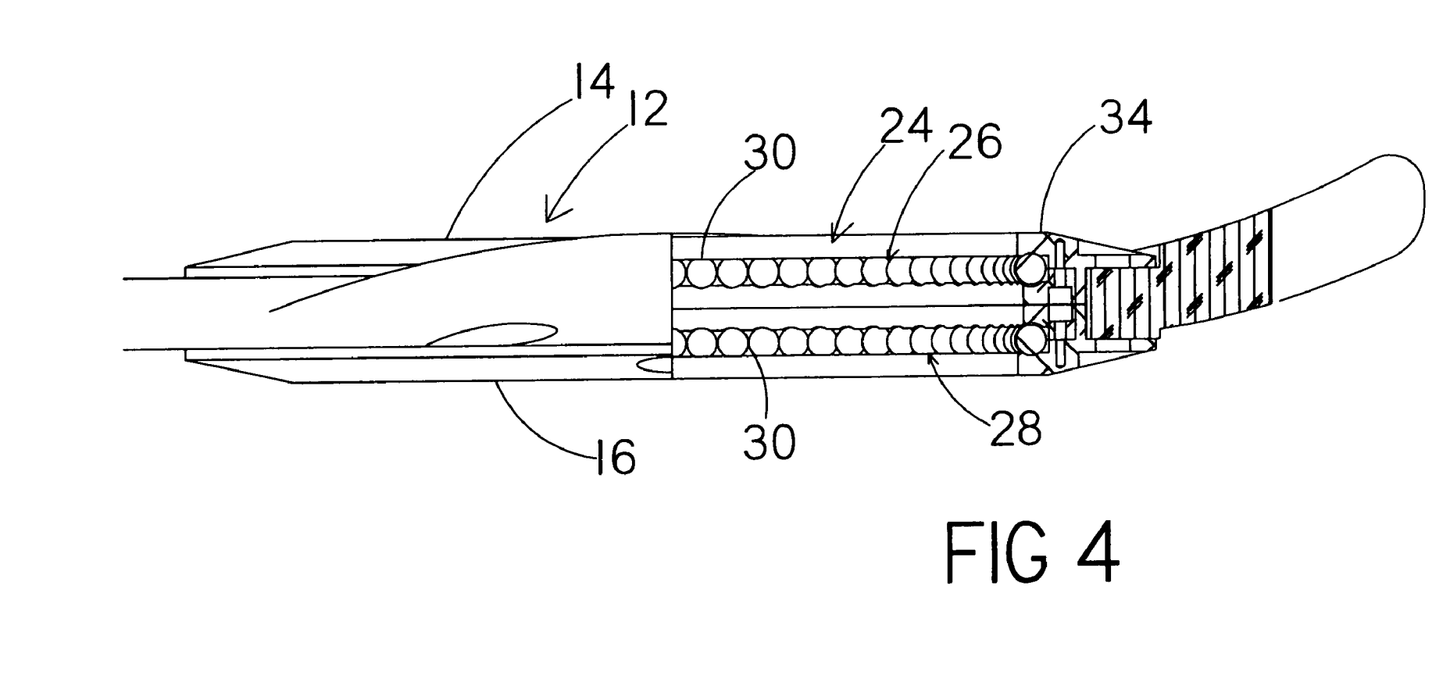
FIG. 4 is a perspective view in partial cutaway of the bearing assembly of the embodiment of FIGS. 2 and 3.

With primary reference to FIGS. 2-4, one preferred embodiment of the bearing assembly 24 comprises at least two bearing sections 26 and 28 each of which includes a plurality of bearings or bearing members 30 disposed in adjacent and/or contiguous relation to one another. Each of the bearing members 30 of each of the sections 26 and 28 extend continuously along the annular or circular length of a corresponding mounting assembly 22. As such, the plurality of bearings 30 are collectively disposed in continuously surrounding and movably engaging relation with a corresponding one of the spherical wheels 20, wherein the wheel is disposed within the central aperture 25 of the respective mounting assembly 22.

Further, the operative placement of the two bearing sections 26 and 28 and the corresponding plurality of bearings 30 associated with each of these sections, are disposed to movably engage and retain the spherical wheel 20 within the central aperture 25. The cooperative placement and structuring of each of the wheels 20 with the corresponding mounting assemblies 22 and bearing assemblies 24 will facilitate that each of the spherical wheels 20 will be maintained in the operative position represented in FIG. 1 relative to the platform 12. Also, each of the wheels 20 will extend or protrude outwardly from the opposite surfaces 14 and 16 of the platform 12.

In addition, the dimension of each of the wheels 20 is such that the portion thereof protruding from each of the opposite surfaces 14 and 16 can be disposed in movable, supporting engagement with a supporting surface over which the platform 12 travels. Therefore, the platform may be selectively disposed in either of two operative positions. Each of the two operative positions is defined by a different one of the opposite faces or surfaces 14 or 16 being disposed in the outer, exposed orientation and in confronting, supporting, engaging relation to the individual rider. Therefore, those individuals who are extremely skilled or practiced in the use of a skateboard or other type platform 12, may effectively "flip" or turn and thereby reverse the position of the opposite surfaces 14 and 16, during various maneuvers by the skilled, individual rider. In addition, the two end portions 12' of the platform 12 may have their configurations altered so as not to extend outwardly from the surface 14, thereby additionally facilitating the placement of the platform 12 in either of the two operative positions.

Figure 1:
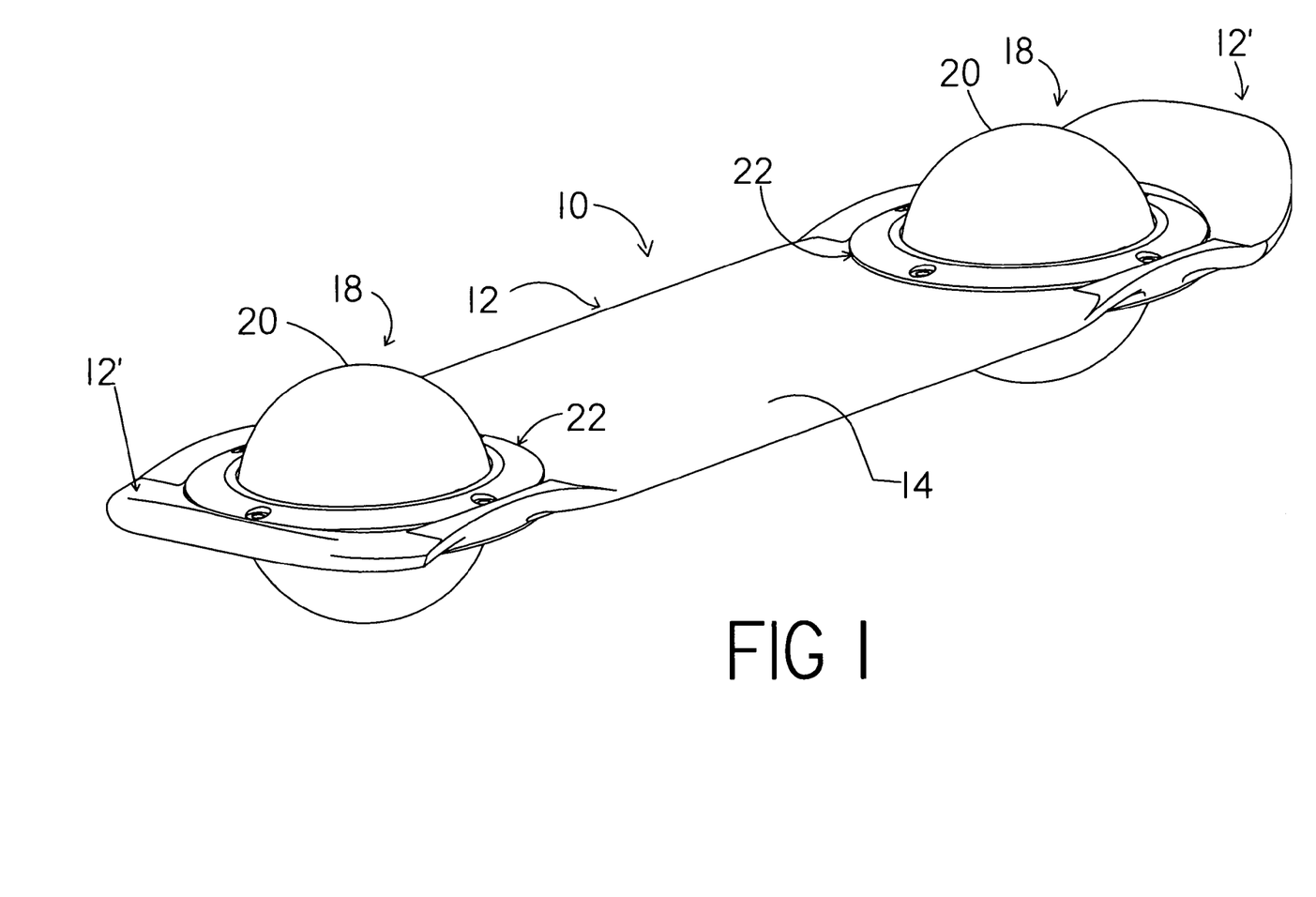
FIG. 1 is a perspective view of the mobile platform assembly of the present invention in an assembled form.

Further with regard to the embodiments of FIGS. 2-4, each of the mounting assemblies 22 includes at least one mounting or retaining plate 34 preferably having an annular configuration. Moreover, the central aperture 25 extends through the mounting plate and is of sufficient size and structure to retain one spherical wheel 20 therein as represented in FIG. 1. The structural features of the embodiments of FIGS. 2-4 represent the mounting assembly 22 having a singular mounting or retaining plate 34. Each of the two sections 26 and 28 of each bearing assembly 24 rides within interior channels or portions 36, which serve as bearing races for the plurality of bearings 30 associated with each of the two bearing sections 26 and 28. As a result, the plurality of bearings 30 associated with each bearing section 26 and 28 are concurrently disposed in movable, retaining engagement with the exterior surface of the corresponding spherical wheel 20 when the wheels 20 are disposed in the operative position of FIG. 1.

An intended freedom of rotation of the spherical wheel 20 is accomplished as it moves through a substantially universal, rotational range of motion. Such freedom of rotation is at least partially accomplished, by the two bearing sections 26 and 28 being disposed in predetermined spaced relation to one another as they retain and engage the exterior surface of the wheel 20 and are movably disposed within separate ones of the race bearings 36 of the mounting or retaining plate 34. The spacing between the two sections 26 and 28 may vary but should be sufficient to provide an adequate retaining force on the exterior surface of the spherical wheels 20 while allowing the aforementioned freedom of movement of the wheel throughout the substantially universal, rotational range of motion, as set forth above. Further, each of the bearing sections 26 and 28 and the bearing members 30 associated therewith are disposed to movably engage the exterior surface of the spherical wheel 20 about different hemispherical portions thereof.

More specifically, regardless of the rotational orientation of the spherical wheel 20, each of the bearing sections 26 and 28 will be disposed on opposite sides of an imaginary "great circle" generated on the exterior surface of the spherical wheel 20. For purposes of clarity, the term "great circle" is defined as a circle, in this case imaginary, generated on the surface of a sphere that divides that the sphere equally into two hemispheres. Accordingly, the term "great circle" as used herein may also be accurately defined as the intersection of the surface of a sphere with a plane passing through the center of that sphere. As clearly represented in FIGS. 3 and 4, when the spherical wheels 20 are connected to the platform as in FIG. 1, each of the bearing sections 26 and 28 are disposed an equally spaced distance from an imaginary great circle generated on the outer spherical surface of a corresponding wheel 20. Moreover, the distance of each bearing section 26 and 28 from a corresponding imaginary great circle, as well as from one another, is sufficient to movably retain the corresponding wheel 20 in its intended position of FIG. 1, while an individual rider is supported on the platform 12.

Therefore, each of the wheels 20 is associated with a mounting plate 34 defining a corresponding mounting assembly 22. Each mounting plate 34 and the bearing assembly 24 associated therewith are cooperatively structured to movably interconnect corresponding ones of the wheels 20 through the platform 12 in a location which facilitates the travel of the platform 12 over a supporting surface while providing sufficient stability to the individual rider during the travel of the platform 12. In order to accomplish such versatility and stability, each of the mounting or retaining plates 20 have the aforementioned annular configuration such that outer peripheral portions thereof are fixedly secured to the platform 12 such as by appropriate connectors (not shown) passing through receiving portions 39 of the retaining or mounting plate 34 as represented. In addition, the bearing assembly 24 comprising the at least two bearing sections 26 and 28 extend about the inner peripheral portion of the annular retaining or mounting plate 34 so as to surround and at least partially define the inner peripheral portion of the central aperture 25. As such, the bearing members associate with each of the bearing sections 26 and 28, extend outwardly from the corresponding bearing race 36 into movable, retaining engagement with the exterior surface of the corresponding one wheel 20.

Figure 5:
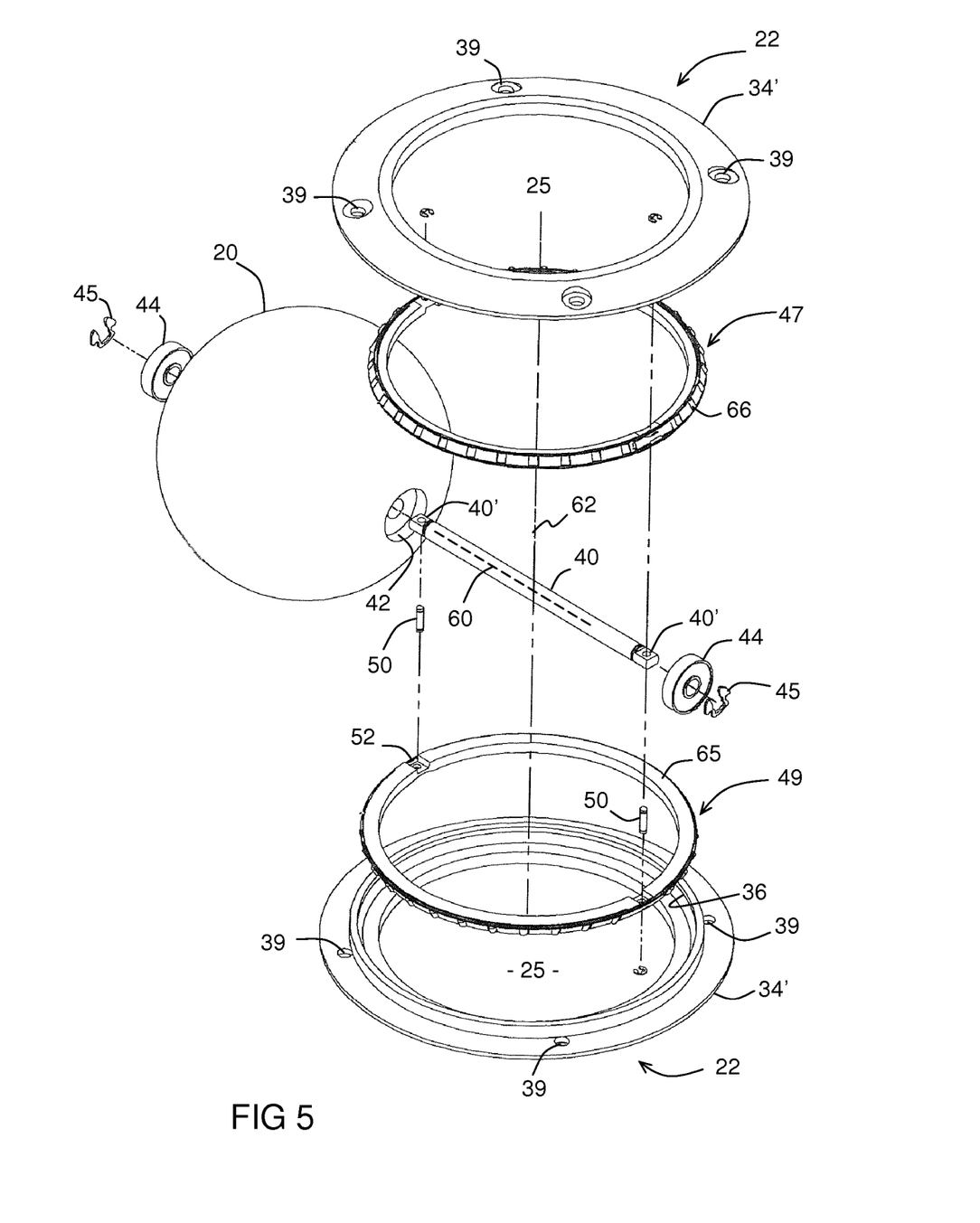
FIG. 5 is a perspective view in exploded form of yet another preferred embodiment of the present invention.
Figure 6:
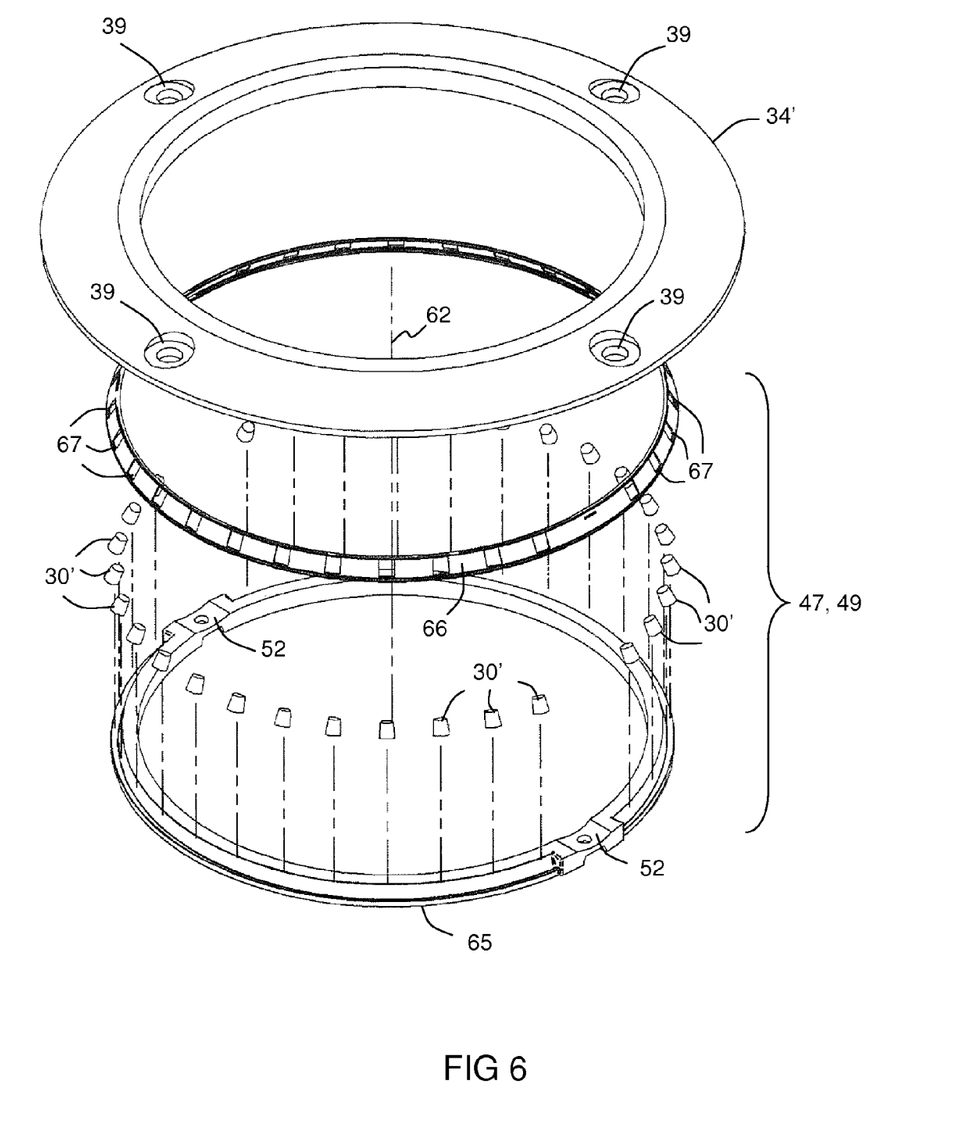
FIG. 6 is a perspective view in exploded form of details of the embodiment of FIG. 5.
Figure 7:
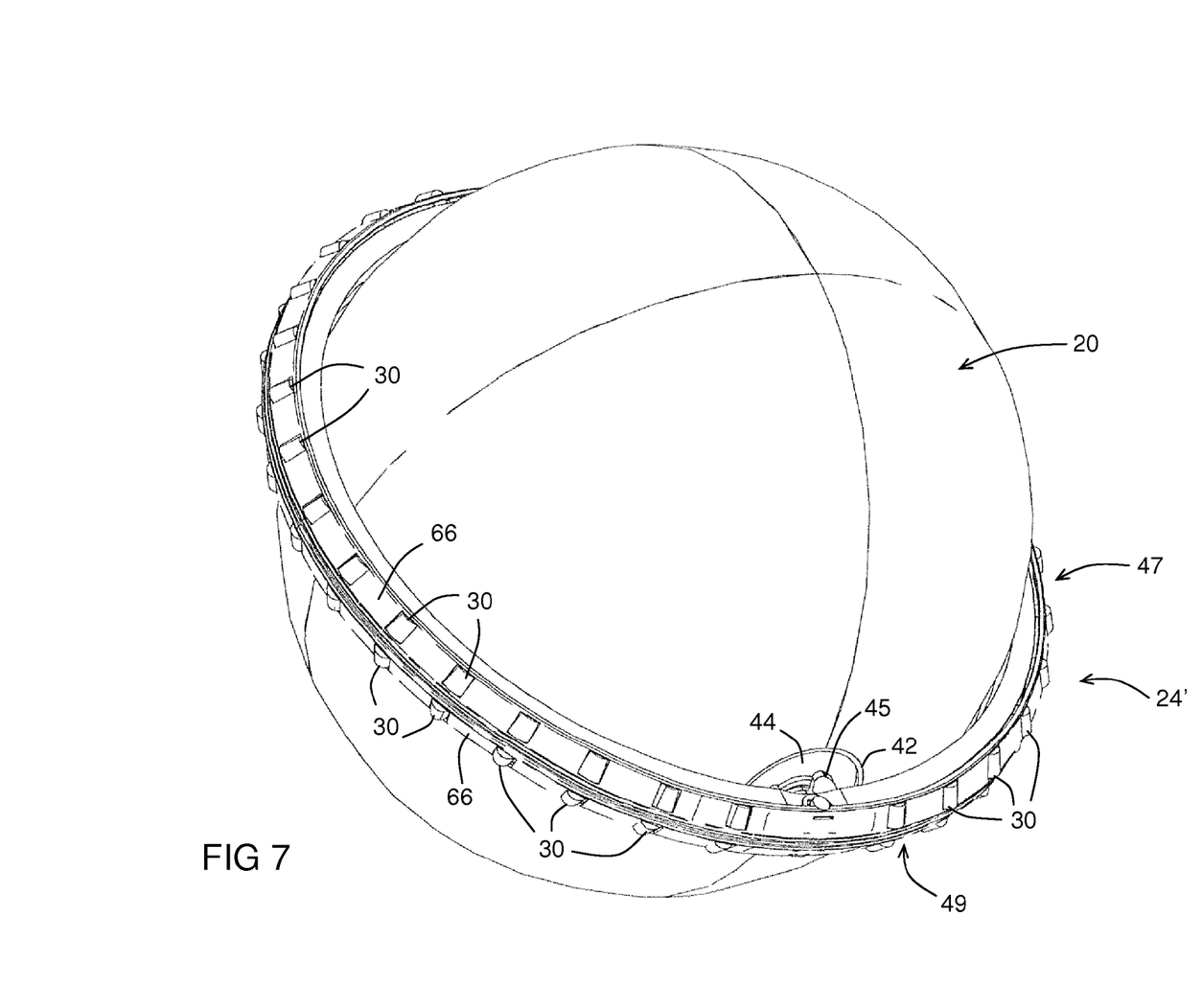
FIG. 7 is a perspective view of the embodiment of FIGS. 5 and 6 in a partially assembled form.

With primary reference to FIGS. 5-7, yet another preferred embodiment of the bearing assembly 24' is represented. More specifically, the bearing assembly 24 as represented in the embodiments of FIGS. 2-4 may be replaced by bearing assembly structure 24'. The differing bearing assemblies 24 and 24' are substantially equivalent in their operation and movement through a substantially universal, rotational range of motion, but differ structurally from one another. Accordingly, either of the bearing assemblies 24 and 24' may be utilized with the embodiment of the transport assembly 10, as represented in FIG. 1.

More specifically, with regard to the embodiment of the bearing assembly 24' of FIGS. 5-7, an elongated axle 40 is disposed to extend through the center of the spherical wheel 20. Once the axle 40 is in the intended centrally extended position, the opposite ends 40' of the axle 40 are disposed to pass through the oppositely disposed recess portions 42 and extend outwardly from the exterior surface of the wheel 20. When so positioned, sealed or other appropriately structured bearings 44 are disposed within the recess portions 42 and mounted on the axle 40 adjacent to and inwardly from the ends 40'. Interconnecting disposition of the bearing members 44 between the axle 40 and the wheel 20 may be accomplished in any appropriate manner, such as by connecting clips 45. Further, the bearing assembly 24' of the embodiment of FIGS. 5-7 may be accurately described as including at least a first bearing portion, defined by the bearings 44 movably interconnecting the axle 40 and the wheel 20. A second bearing portion of the bearing assembly 24' comprises two bearing sections 47 and 49 fixedly connected to one another and fixedly connected to the ends 40' by appropriate connectors 50 passing through the ends 40' and into receiving portions 52 formed in each of the bearing sections 47 and 49.

Therefore, the bearing assembly 24' associated with each of the spherical wheels 20 includes a first bearing portion 44 and a second bearing portion defined by the two bearing sections 47 and 49. As set forth above, the first bearing portion 44 rotationally interconnects the spherical wheel 40 to the centrally disposed axle 40. Concurrently, the second bearing portion 47, 49, being fixedly connected to the axle 40 via its ends 40', will serve to movably and rotationally interconnect the corresponding wheels 20 to the mounting assembly 22 and thereby to the platform 12. As a result, the elongated axle 40 and its cooperative interconnection with the first bearing portion 44 serves to define a first rotational axis, schematically represented as 60 extending along the length of the axle 40. In addition, a second rotational axis, schematically represented as 62, passes through the center of the sphere 20 in intersecting relation to the first rotational axis 60. The second rotational axis 62 is defined by a fixed connection of the first and second bearing sections 47 and 49 with one another and with the opposite ends 40' of the axle 40.

As represented in FIG. 7, an assembled view of the bearing assembly 24' includes the first and second bearing sections 47 and 49 connected to the ends 40' of the centrally disposed axle 40 and to one another. In use and with additional reference to FIG. 5, the first and second bearing sections 47 and 49, defining the aforementioned second bearing portion of bearing assembly 24', will rotate about the second longitudinal axis 62 within and relative to the mounting assembly 22 and the platform 12. Because of the fixed connection of the axle 40 with the first and second bearing 47 and 49 the wheel 20 will also rotate about the second axis of rotation 62 along with the first and second bearing sections 47 and 49. In addition, the wheel 20 will concurrently rotate about the first rotational axis 60 due to the axle 40 being rotationally interconnected to the corresponding wheel 20 by the bearings 44, disposed within recesses 42.

Additional structural features associated with the bearing assembly 24' are further represented in FIGS. 5-7. More specifically, the mounting assembly 22 in this embodiment may comprise two mounting or retaining plates 34' each having an annular configuration so as to define the central aperture 25 in which the spherical wheel 20 is operatively positioned as represented in FIG. 1. Also, each of the first and second bearing sections 47 and 49 are represented in detail in FIG. 6 and include a plurality of individual bearings or bearing members 30' movably captured or retained on the annular base portion 65 by means of a bearing cage 66. The bearing cage 66 includes a plurality of apertures formed therein through which the individual bearings 30' protrude when the first and second bearing sections 47 and 49 are operatively assembled as represented in FIG. 7. Accordingly, each of the bearings 30' are disposed in spaced relation to one another as they extend through the apertures 67 and rotate between the base portion 65 and the bearing cage 66. During such positioning, the protrusion of the bearing members 30' from the apertures 67 will allow the bearing members 30' to ride within the correspondingly disposed bearing race 36 of the corresponding mounting or retaining plate 34' as indicated in FIG. 5. Accordingly, each of the bearing sections 47 and 49 are capable of rotation about the second rotational axis 62 along with the centrally disposed axle 40 and a corresponding one of the wheels 20 due to an interconnection of the ends 40' of the axle 40 with the first and second bearing sections 47 and 49. As set forth above, the wheel 20 is also free to concurrently rotate about the first rotational axis 60, thereby facilitating movable connection of each of the wheels 20 to the platform 12 through the substantially universal, rotational range of motion, as also set forth above.

Yet additional structural features of the bearing assembly 24' of the embodiments of FIGS. 5-7 include the preferred configuration of each of the bearing members 30' into a generally tapered configuration, as represented. As such, the tapered configuration of each of the plurality of bearing members 30' may be more accurately and specifically defined as assuming a conical-frustum configuration, as represented.

Figure 8:
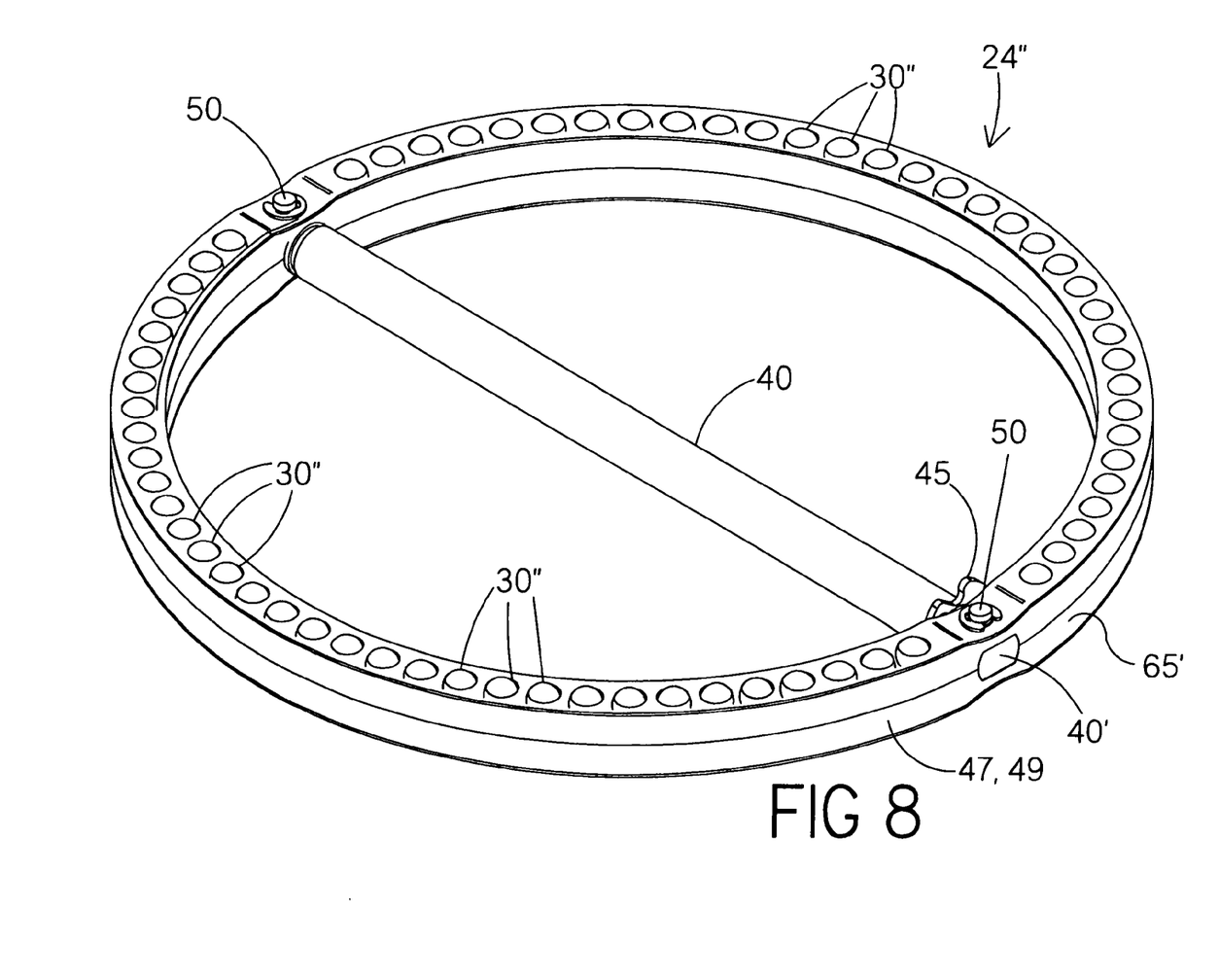
FIG. 8 is a perspective view of yet another embodiment of a bearing assembly which may be utilized with the embodiment of FIG. 1.
Figure 9:
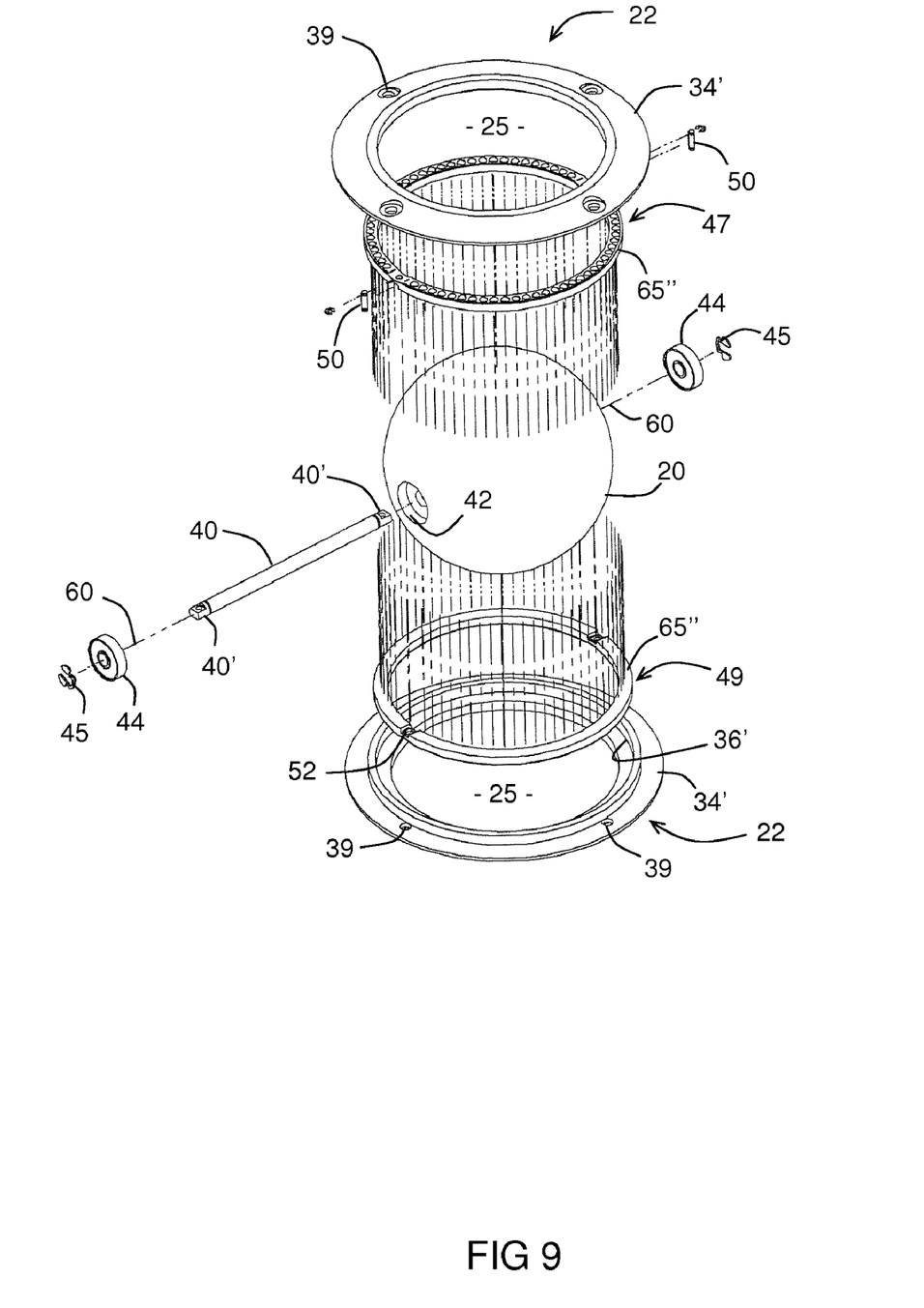
FIG. 9 is an exploded view of the bearing assembly of the embodiment of FIG. 8 and an associated one spherical wheel.
Figure 10:
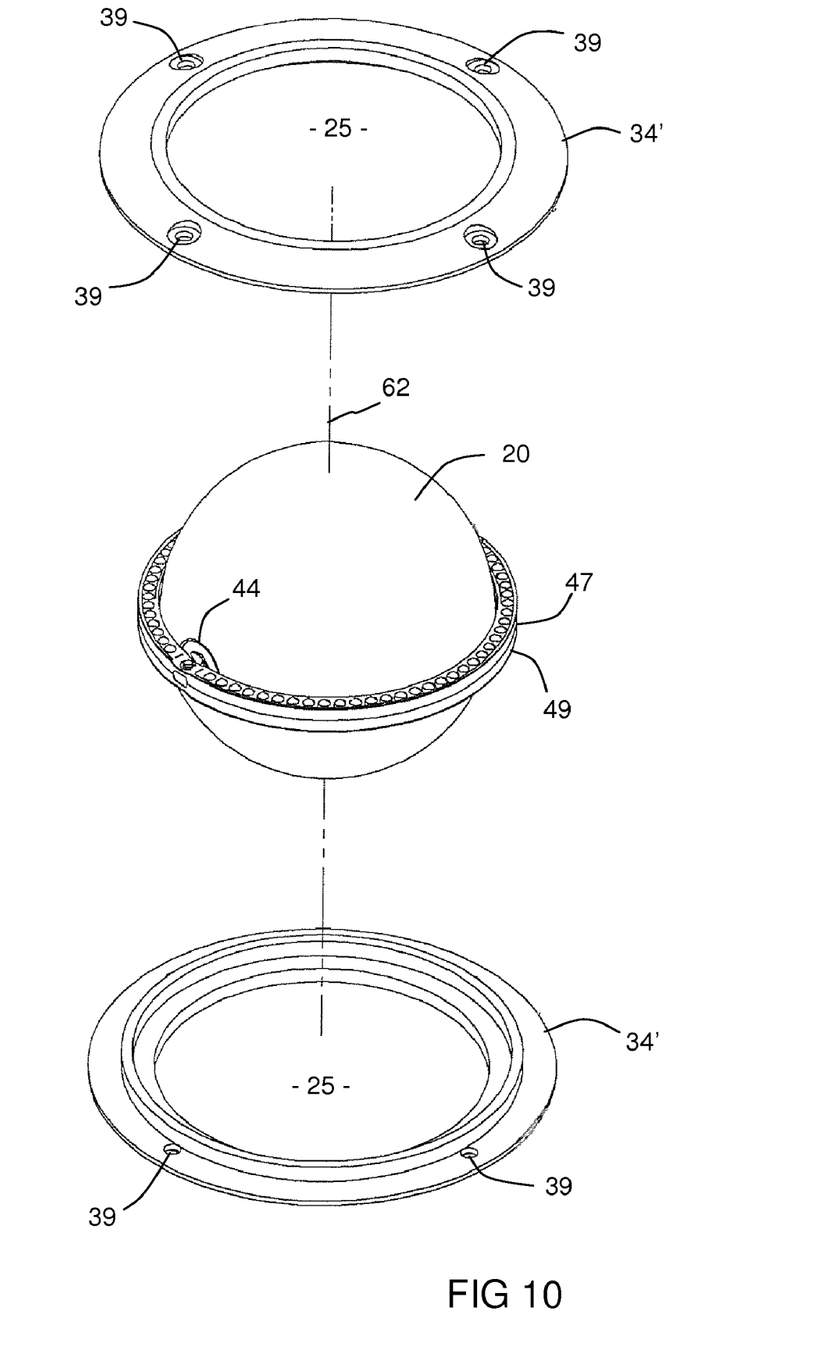
FIG. 10 is a perspective view in exploded form of a partially assembled embodiment of FIG. 9.

Yet another preferred embodiment of the bearing assembly is generally represented as 24' in FIGS. 8-10. The structural and operative features of this embodiment are similar in most aspects. However, the primary difference is the configuration of the plurality of bearing members 40" being spherical rather than tapered as in the embodiment of FIGS. 5-7. Accordingly, the first and second bearing sections 47 and 49 may be defined as a single housing or base member 65', as represented in FIG. 8 or may comprise two, separate base members 65" as represented in FIGS. 9 and 10. In either embodiment, the axle 40, once centrally disposed through the corresponding spherical wheel 20, is interconnected at its opposite ends 40' to rotate with the connected first and second bearing sections 47 and 49 relative to the mounting assembly 22. The mounting assembly 22 may also include two retaining or mounting plates 34' each having an appropriately disposed and configured bearing race 36 as indicated.

Therefore while the individual bearing members 30' and 30" may have different configurations, bearing members 30' and 30" are operable in the manner described to facilitate the rotation of corresponding ones of the wheels 20 about the second rotational axis 62. However, the tapered or conical/frustum bearings may have a physical and/or operative advantages by converting horizontal forces into axial forces as well as allowing the vertical forces exerted thereon to not bind the system but rather displace such vertical forces along the inner surfaces of the corresponding retaining or mounting plates 34'.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly structured to transport an individual over a supporting surface, said assembly comprising:
a platform comprising oppositely disposed surfaces,
a wheel assembly rotationally connected to said platform and disposable in movable engagement with the supporting surface,
said wheel assembly including at least one wheel having a spherical configuration,
a bearing assembly structured to movably interconnect said one wheel to said platform, said bearing assembly cooperatively structured with said platform to facilitate substantially universal, rotational movement of the one wheel relative to said platform,
said one wheel disposed and dimensioned to extend concurrently outward from each of said oppositely disposed surfaces of said platform,
wherein said bearing assembly is disposed in movable, retaining engagement with an exterior surface of said one wheel, said bearing assembly and said one wheel cooperatively disposed and structured to facilitate a substantially universal range of motion of said one wheel relative to said platform, and
wherein said bearing assembly comprises two bearing sections each disposed in retaining engagement with said exterior surface in spaced relation to one another and on opposite sides of a common, correspondingly disposed imaginary great circle of said exterior surface of said one wheel.

2. An assembly as recited in claim 1 wherein said one wheel extends through said platform in outwardly extending relation to each of said oppositely disposed surfaces; said platform and said wheel assembly cooperatively structured to assume at least two operative positions, each of said two operative positions defined by a different one of said oppositely disposed surfaces disposed in confronting, supporting relation to the individual.

3. An assembly as recited in claim 1 wherein said bearing assembly is disposed in retaining engagement with said exterior surface in adjacent relation to an imaginary great circle on said exterior surface of said one wheel.

4. An assembly as recited in claim 1 wherein said two bearing sections are substantially equally spaced from the imaginary great circle on an exterior surface of said one wheel.

5. An assembly as recited in claim 1 wherein each of said two bearing sections is disposed in continuous surrounding relation to said exterior surface and in parallel relation to one another.

6. An assembly as recited in claim 1 wherein each of said bearing sections comprises a plurality of contiguous bearings collectively disposed in continuous, surrounding engagement with said exterior surface of said one wheel.

7. An assembly as recited in claim 1 further comprising a mounting assembly interconnecting said one wheel to said platform.

8. An assembly as recited in claim 7 wherein said mounting assembly is disposed in retaining engagement with said bearing assembly; said bearing assembly disposed in interconnecting relation between said one wheel and said mounting assembly.

9. An assembly as recited in claim 8 wherein at least a portion of said mounting assembly comprises a bearing race disposed in retaining relation to said bearing assembly.

10. An assembly as recited in claim 8 wherein said mounting assembly comprises at least one mounting plate having an annular configuration including a central aperture extending through said mounting plate and an outer peripheral portion connected to said platform.

11. An assembly as recited in claim 10 wherein said one wheel is movably disposed in said central aperture in concurrent, outwardly protruding relation to opposite sides of said mounting plate, said bearing assembly connected to an inner peripheral portion of said mounting plate and structured for movable retaining engagement with said one wheel.

12. An assembly as recited in claim 11 wherein said bearing assembly comprises two bearing sections each connected to said inter peripheral portion in spaced relation to one another and in continuously surrounding relation to said one wheel disposed within said central aperture.

13. An assembly as recited in claim 12 wherein each of said bearing sections comprises a plurality of bearing members collectively disposed in continuous, surrounding engagement with said exterior surface of said one wheel disposed within said central aperture.

14. An assembly as recited in claim 1 wherein said bearing assembly comprises a first portion and a second portion collectively and movably interconnecting said one wheel to said platform; said first and second portions disposed and structured to facilitate a substantially universal rotational range of motion of said one wheel relative to said platform.

15. An assembly as recited in claim 14 further comprising an axle extending through a center of said one wheel and at least partially defining at least one rotational axis of said one wheel.

16. An assembly as recited in claim 15 wherein said first portion of said bearing assembly is disposed in movable interconnecting relation between said axle and said one wheel.

17. An assembly as recited in claim 16 wherein said second bearing portion is disposed in movable, interconnecting relation between said axle and said platform.

18. An assembly as recited in claim 17 further comprising a mounting assembly connected to said platform;
said second portion of said bearing assembly movably interconnecting said one wheel to said mounting assembly.

19. An assembly as recited in claim 15 further comprising a mounting assembly connected to said support platform; said second portion of said bearing assembly movably interconnecting said axle to said mounting assembly.

20. An assembly as recited in claim 19 wherein said mounting assembly comprises at least one mounting plate fixedly connected to said support platform in retaining, movable engagement with said second portion of said bearing assembly.

21. An assembly as recited in claim 20 wherein said second portion of said bearing assembly comprises at least one bearing section, said one mounting plate comprising a bearing race disposed and structured to movably receive said one bearing section therein.

22. An assembly as recited in claim 19 wherein said mounting assembly comprises at least two mounting plates each fixedly connected to said platform adjacent a different one of said oppositely disposed surfaces thereof, each of said two mounting plates disposed in retaining, movable engagement with said second portion of said bearing assembly.

23. An assembly as recited in claim 22 wherein said second portion of said bearing assembly comprises two bearing sections, each of said mounting plates comprising a bearing race disposed and structured to movably receive a correspondingly disposed one of said bearing sections therein.

24. An assembly structured to transport an individual over a supporting surface, said assembly comprising:

a platform including a wheel assembly disposable in movable engagement with a supporting surface over which the platform travels,
said wheel assembly including at least one wheel having a spherical configuration, said one wheel extending outwardly from said platform into engageable relation with the supporting surface,
a bearing assembly movably interconnecting said one wheel to said platform and disposed and structured to facilitate substantially universal, rotational movement of said one wheel relative to said platform,
an axle extending through said one wheel and at least partially defining a first rotational axis of said one wheel,
said bearing assembly disposed and structured to rotationally connect said one wheel to said axle about said first rotational axis and said rotationally connect said one wheel to said platform about a second rotational axis, and
said bearing assembly disposed and structured to facilitate concurrent rotation of said one wheel about said first and second rotational axis to define said substantially universal, rotational movement of said one wheel relative to said platform.

25. An assembly as recited in claim 24 wherein said first portion of said bearing assembly is disposed in movable interconnecting relation between said axle and said one wheel.

26. An assembly as recited in claim 24 wherein said second portion is disposed in movable, interconnecting relation between said axle and said platform.

27. An assembly as recited in claim 24 further comprising a mounting assembly connected to said platform; said second portion of said bearing assembly movably interconnecting said one wheel to said mounting assembly.

28. An assembly as recited in claim 27 wherein said mounting assembly comprises at least one mounting plate fixedly connected to said support platform in movable retaining engagement with said second portion of said bearing assembly.

29. An assembly as recited in claim 28 wherein said second portion of said bearing assembly comprises at least one bearing section, said one mounting plate comprising a bearing race disposed and structured to movably receive said one bearing section therein.

30. An assembly as recited in claim 27 wherein said mounting assembly comprises at least two mounting plates each fixedly connected to said platform adjacent a different oppositely disposed surface thereof, each of said two mounting plates concurrently disposed in movable retaining engagement with said second portion of said bearing assembly.

31. An assembly as recited in claim 30 wherein said second portion of said bearing assembly comprises two bearing sections, each of said mounting plates comprising a bearing race disposed and structured to movably receive a correspondingly disposed one of said bearing sections therein.

32. An assembly as recited in claim 31 wherein said bearing assembly comprises two bearing sections each disposed in retaining engagement with an exterior surface of said one wheel in spaced relation to one another and on opposite sides of a common, correspondingly disposed imaginary great circle on said exterior surface of said one wheel.

33. An assembly as recited in claim 32 wherein said two bearing sections are substantially equally spaced from the common, correspondingly disposed great circle on said exterior surface of said one wheel.

34. An assembly as recited in claim 32 wherein each of said bearing sections comprises a plurality of bearing members collectively disposed in continuous, surrounding engagement with said exterior surface of said one wheel.

35. An assembly as recited in claim 32 wherein each of said bearing sections comprises a plurality of bearings collectively disposed in continuous, surrounding engagement with said exterior surface of said one wheel; each of said plurality of bearings having a substantially conical-frustum configuration.

36. An assembly as recited in claim 24 wherein said wheel assembly comprises at least two wheels each having a spherical configuration and concurrently extending outwardly from each oppositely disposed surface of said platform into engageable relation with the supporting surface.

37. An assembly as recited in claim 36 further comprising at least two bearing assemblies each disposed and structured to movably connect a different one of said wheels to said platform, each of said bearing assemblies disposed and structured to facilitate said substantially universal, rotational movement of a corresponding one of said wheels relative to said platform.

* * * * *